United States Patent [19]
Weber

[11] 3,933,257
[45] Jan. 20, 1976

[54] WAREHOUSE SHELVING SYSTEM

[76] Inventor: Reinold Karl Weber, August-Siebert-Strasse 4, Frankfurt am Main, Germany

[22] Filed: July 18, 1974

[21] Appl. No.: 489,481

Related U.S. Application Data

[63] Continuation-in-part of Ser. No. 245,963, April 20, 1972, abandoned.

[30] Foreign Application Priority Data
Dec. 21, 1973 Germany............................ 2363795

[52] U.S. Cl. .......................... 214/16.4 A; 214/730
[51] Int. Cl.$^2$ .......................................... B65G 1/06
[58] Field of Search ............. 214/730, 16 B, 16.4 R, 214/16.4 A

[56] References Cited
UNITED STATES PATENTS

| | | | |
|---|---|---|---|
| 3,561,620 | 12/1969 | Willis.............................. | 214/16.4 A |
| 3,608,749 | 9/1971 | Zollinger......................... | 214/16.4 A |
| 3,741,419 | 6/1973 | Bergerhoff et al................. | 214/730 |

FOREIGN PATENTS OR APPLICATIONS

| | | | |
|---|---|---|---|
| 1,207,146 | 9/1970 | United Kingdom............ | 214/16.4 A |

*Primary Examiner*—Robert J. Spar
*Assistant Examiner*—R. B. Johnson
*Attorney, Agent, or Firm*—Karl F. Ross; Herbert Dubno

[57] ABSTRACT

Several stacks of shelves in a warehouse, separated by aisles, are vertically subdivided into a multiplicity of tiers each with a depth of four storage spaces accommodating respective pallet-size loads. At the level of certain tiers of each stack the two inner storage spaces are converted into throughgoing passageways for the manual assembly of fractional orders, these passageways extending parallel to the aisles bounding the respective stack. A stacker crane in each aisle comprises a platform accommodating two pallets in a direction perpendicular to the passageways, the platform supporting a telescoping arm bracketed by a pair of longitudinally extending ledges forming part of an underlying lifting frame; the ledges carry respective transfer blocks allowing for the longitudinal displacement of a pallet from one extremity of the telescoping arm to the other upon an elevation of the lifting frame to raise the pallet off that arm. A pallet can thus be repositioned on the platform during operation of the lifting crane, with extension of the arm into a storage space next to a passageway occurring after the platform has been aligned with the corresponding tier.

3 Claims, 7 Drawing Figures

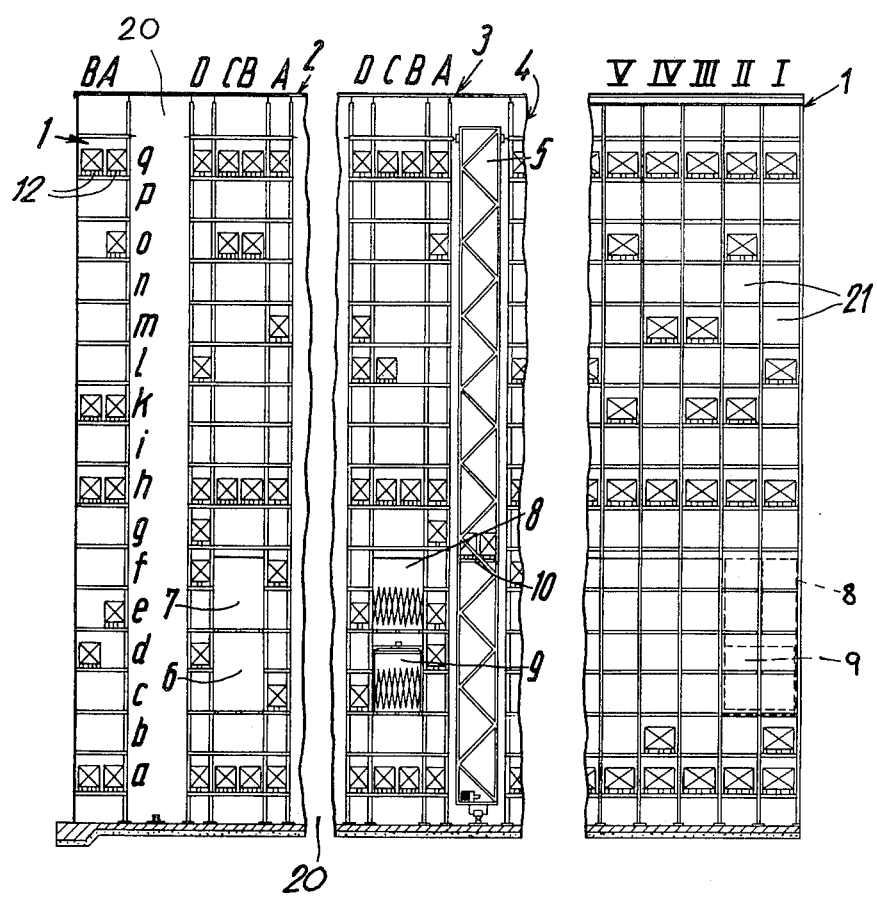

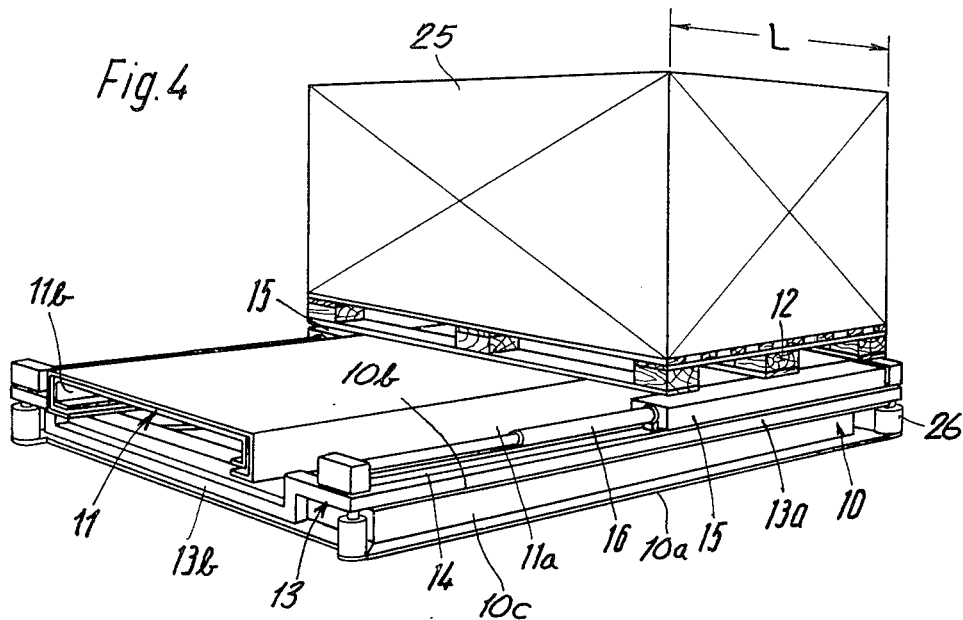
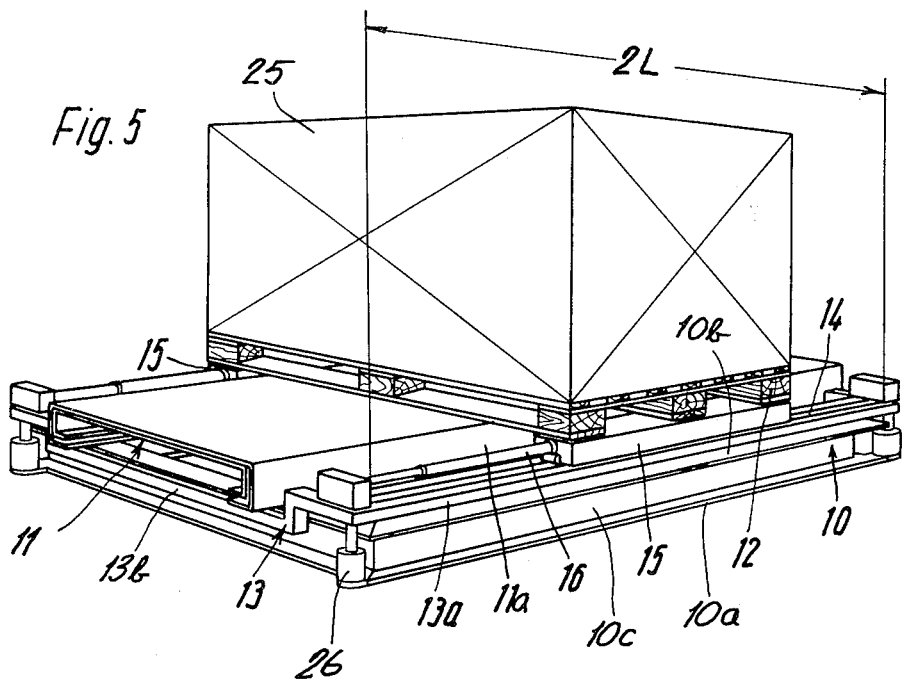

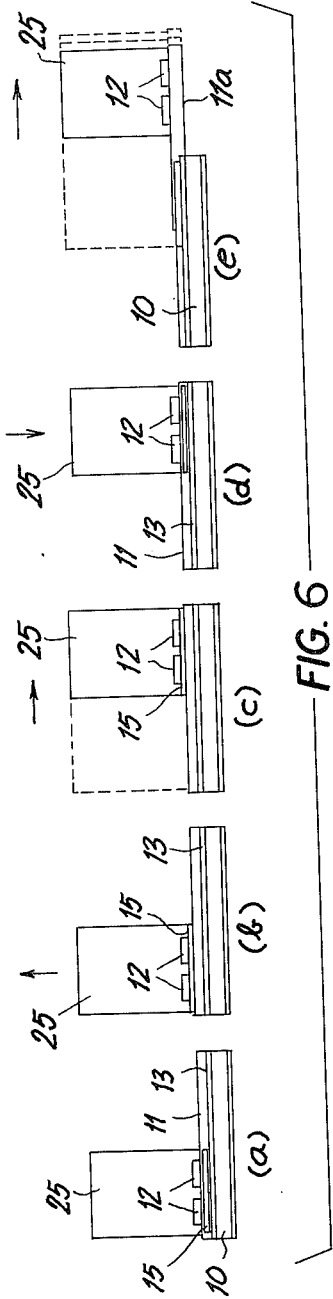
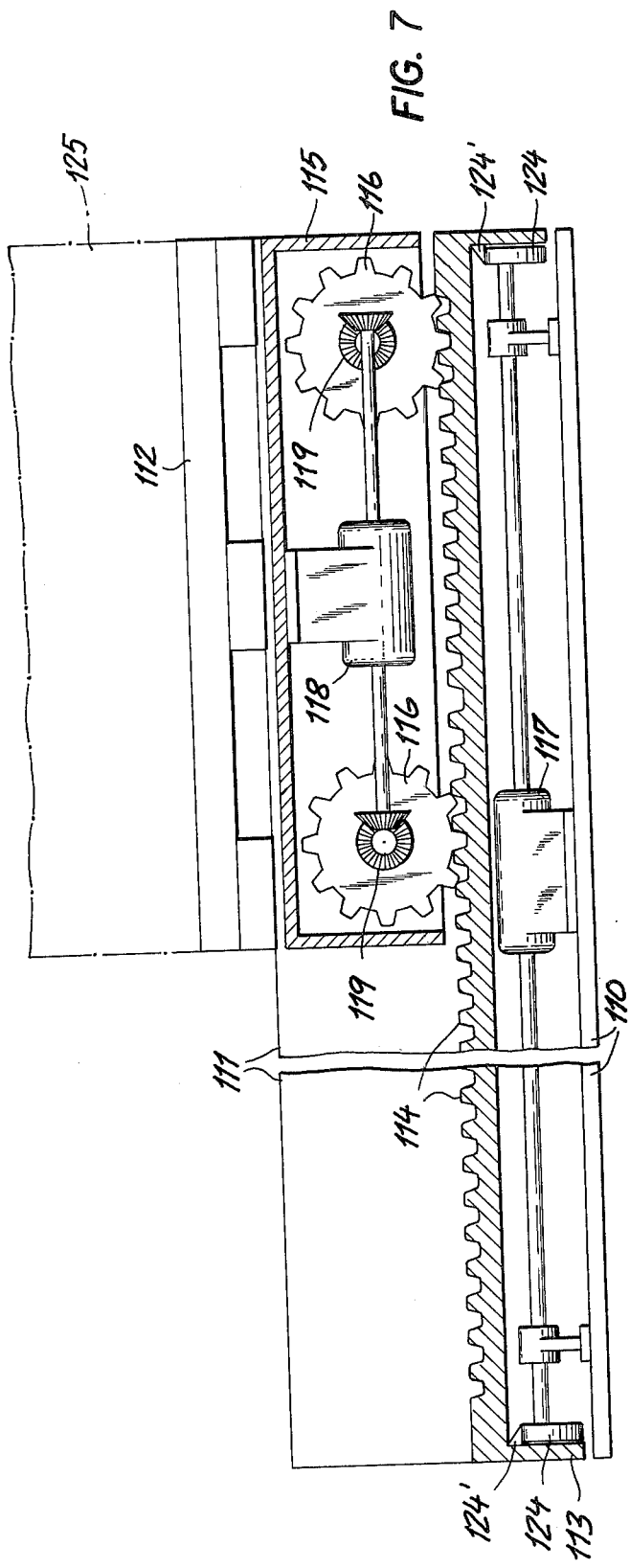

WAREHOUSE SHELVING SYSTEM

CROSS-REFERENCE TO RELATED INVENTION

This application is a continuation-in-part of my co-pending application Ser. No. 245,963 filed Apr. 20, 1972, now abandoned.

FIELD OF THE INVENTION

My present invention relates to a shelving system, as used in warehousing, designed to hold pallet-size loads in storage spaces stacked in a multiplicity of tiers on opposite sides of an aisle having a depth of substantially two pallet lengths.

BACKGROUND OF THE INVENTION

In such a shelving system it is generally necessary to load or unload a storage space of a stack through an aisle separating it from an adjoining stack, e.g. in order to transfer a loaded pallet from one stack to the other. This is particularly desirable where shipments are to be assembled from the contents of several storage spaces on the two stacks, as is frequently the case in large-scale industrial warehousing.

It is known, e.g. from U.S. Pat. No. 3,608,749, to operate a stacker crane in an aisle between high-rising storage racks, such a crane having a platform with a bidirectionally extendable arm which can reach into the storage spaces on either side of the aisle to pick up a pallet for removal to an unloading station or to deposit a pallet picked up at a loading station. If the pallets are stacked two deep on either side of the aisle, the extendability of the arm in either direction must be slightly greater than two pallet lengths. If the depth of the aisle also slightly exceeds two pallet lengths, the stacker crane can carry a pair of pallets simultaneously extracted from or to be deposited in a rack.

If, in such a system, the arm is to load or unload only a single storage space proximal to the aisle, the corresponding pallet comes to rest on one of the extremities of that arm so as to be deliverable to another storage space on the same side of the aisle but not on the opposite aisle. This limited maneuverability of the stacker crane complicates the filling of orders which must be assembled from goods stored on both sides of the aisle.

OBJECTS OF THE INVENTION

The general object of my present invention, therefore, is to provide a method of and means for facilitating the transfer of individual pallets from one side of an aisle to the other with the aid of a bidirectionally extendable arm of a stacker crane accommodating two (or possibly more) pallets at one time.

A more particular object is to provide a warehousing system which, through the use of such a stacker crane, enables the assembly of fractional (i.e. sub-pallet-size) loads from different storage racks or stacks separated by one or more aisles each with a depth substantially equaling a plurality of storage spaces.

SUMMARY OF THE INVENTION

I realize these objects, in accordance with the present invention, by the provision of lifting means alongside the bidirectionally extendable arm on a platform which is part of a transportable pallet carrier such as a stacker crane, the lifting means supporting a transfer device which is longitudinally displaceable between opposite extremities of the arm and which has a length not greater than half that of the contracted arm. After the transfer device has been placed under a pallet riding on one extremity of the contracted arm, an operating mechanism actuates the lifting means to engage the transfer device with a pallet and raise the latter off that arm whereupon the transfer device is moved into an alternate position where the pallet is deposited on the other extremity of the arm. After reversal of the operation of the lifting means to disengage the transfer device from the pallet, the arm can be extended in the direction of its loaded extremity to deposit the pallet in a storage space on the corresponding side of the aisle. The same mechanism, of course, can be operated in the reverse order for the extraction of the pallet from such a storage space if for any reason it is desired that the pallet be shifted to the remote arm extremity preparatorily to unloading.

In my improved system the shifting of a pallet from one arm extremity to the other (i.e. from one of its halves to the other in the case of an aisle two pallet lengths deep) takes place entirely within the confines of the aisle, with the extendable arm contracted to its minimum length, so that this operation can be performed during the displacement of the platform between storage levels or tiers without interference from the adjoining shelf assemblies.

According to a more particular feature of my invention, the stacks are provided at certain levels with throughgoing transfer passageways paralleling the intervening aisles served by respective stacker cranes, these passageways adjoining a single row of storage spaces next to each aisle. Such a passageway can be used as a shipping area for the manual assembly of part of the contents of several pallet-size loads deposited by the stacker crane in that single row of storage spaces; by virtue of the aforedescribed construction of my improved pallet carrier, these loads may be readily brought together from anywhere within the system.

BRIEF DESCRIPTION OF THE DRAWING

The above and other features of my invention will now be described in detail with reference to the accompanying drawing in which:

FIG. 1 is a schematic side-elevational view of several storage racks forming part of a warehouse system embodying my invention;

FIG. 2 is a fragmentary front view of one of the storage racks of FIG. 1;

FIGS. 4 and 5 are perspective views of a loaded stacker-crane platform different operating positions;

FIG. 6 is a set of diagrams illustrating the operation of a pallet-shifting mechanism on the platform shown in FIGS. 4 and 5; and FIG. 7 is a longitudinal sectional view of a modified pallet shifter.

SPECIFIC DESCRIPTION

Figure 3:
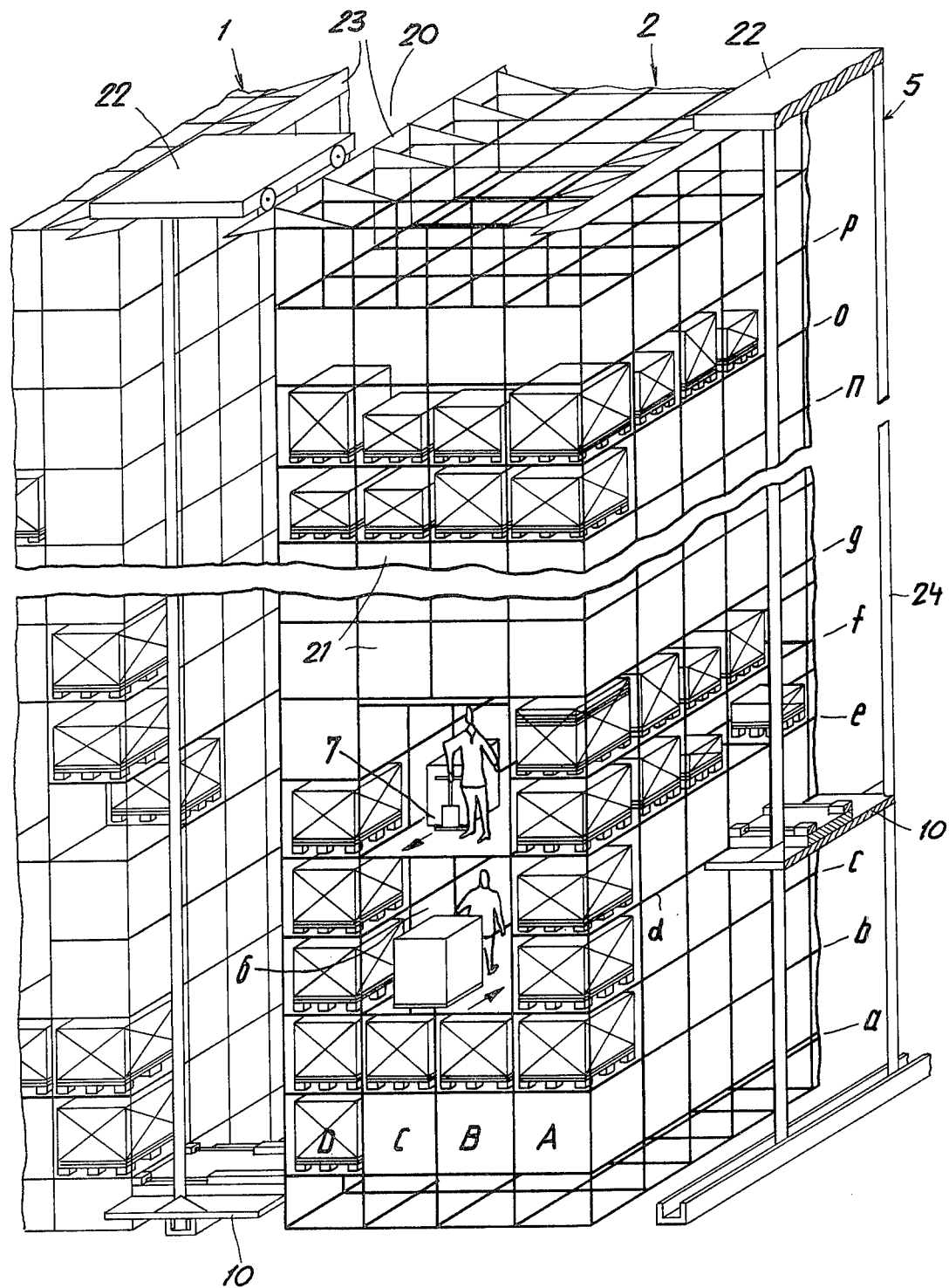
FIG. 3 is a perspective view of a representative part of the warehouse system, including an associated stacker crane.

In FIGS. 1 – 3 I have shown a group of storage racks 1, 2, 3, 4 separated by aisles 20 accommodating respective stacker cranes 5. The racks are vertically subdivided into a multiplicity of tiers $a \ldots q$, each tier accommodating an array of storage spaces 21 for load-carrying pallets 12. The first rack 1 (as well as the nonillustrated last rack of the group) has a depth equaling half that of the intermediate racks, being subdivided in the dimension of its depth into stacks A and B. Racks 2, 3, and 4 are each subdivided into four stacks A, B, C, D, being thus four storage spaces deep. In the transverse dimension, i. e. parallel to the aisle 20, these stacks form a multiplicity of adjoining columns I, II, III, IV, V . . . . At levels $c$, $d$ and $e$, $f$ the partitions between tiers and between the middle stacks B, C of the intermediate racks 2, 3, etc. have been omitted to form a pair of transverse passageways 6, 7 which extend the full width of the rack group and are vertically interconnected at their ends by a shaft 8 accommodating an elevator 9, facilitating the direct transfer of boxes or crates therebetween. These superimposed passageways could also be connected by a staircase.

Each stacker crane 5 comprises a carriage 22 riding on overhead rails 23 and supporting a depending frame 24 for the guidance of a platform 10 which is elevated by a conventional hoist mechanism not shown. This platform 10 and associated elements have been illustrated in greater detail in FIGS. 4 and 5.

As shown in FIGS. 4 and 5, platform 10 supports an extensible arm 11 of the telescoped type whose outer member 11a can be shifted in either direction over a distance somewhat exceeding twice the length L of a pallet 12 (as measured in the direction of depth of the aisles and racks shown in the preceding figures). Platform 10 also has a length 2L which is slightly less than the depth of an aisle 20 (FIGS. 1 and 3). The displacement of an outer member 11a of arm 11 relative to its inner member or members, one of which is visible at 11b, is carried out by conventional means not further illustrated. Platform 10 comprises a lower deck 10a and an upper deck 10b separated by a web 10c, the arm 11 resting on the upper deck 10b with its etxremities spacedly overlying a lifting frame 13 whose lateral elements 13a are overhung by the ends of a pallet 12 resting on the arm. Frame elements 13a form respective tracks 14 for a pair of sliding blocks 15 which can be displaced by a pair of horizontal hydraulic jacks 16 parallel to the longitudinal edges of arm 11. The sliders 15, of length L, are normally spaced from the overhanging pallet ends but can be raised into contact therewith by a lifting mechanism including a set of vertical hydraulic jacks 26 which engage the frame 13 at its corners and bear upon the lower deck 10a of platform 10. The downwardly offset transverse elements 13b of lifting frame 13 are sufficiently separated from the underside of arm 11 to stay clear of that arm even when the jacks 26 are actuated to raise the frame 13 high enough to engage the overhanging pallet ends and lift the pallet 12 off the upper arm surface.

It is thus possible, through alternate operation of horizontal jacks 16 and vertical jacks 26, to move the load 25 from its position (FIG. 4) on one half of arm 11 to an alternate position on the oppiste half, FIG. 5 illustrating the transition from one position to the other with the pallet 12 elevated by the frame 13 to be out of contact with arm 11. The sequence of operations has been diagrammatically depicted in FIG. 6 which, in step $(a)$, shows the load 25 in an extreme left-hand position resting with its pallet 12 on the contracted arm 11. Step $(b)$ shows the raising of lifting frame 13, sliders 10, pallet 12 and load 25; in step $(c)$ the assembly 15, 12, 25 has been shifted to an extreme right-hand position. Step $(d)$ represents the lowering of frame 13, with pallet 12 again coming to rest on arm 11. Step $(e)$ shows the extension of arm member 11a toward the right, to move the pallet 12 with its load 25 into an adjoining storage space. This extension of the arm can be by a distance slightly exceeding either the single length L or the double length 2L, depending on whether the load is to be deposited in (or extracted from) a storage space proximal to the aisle or an adjoining space farther inward.

The same sequence of operations, of course, is followed when the load L is to be moved from its position on the right-hand half of arm 11 into a storage space to the left of platform 10 or vica versa.

FIG. 7 shows a modified pallet carrier comprising a platform 110 supporting an extensible arm 111 which is flanked by a pair of racks 114 (only one shown) resting on a lifting frame 113. The racks 114 are engaged by pinions 116 on a carriage 115, these pinions being rotatable by a carriage-borne reversible electric motor 118 via bevel gears 119. Another electric motor 117, provided with suitable reduction gearing, is operable to rotate a set of lifting cams 124 (two of them being visible in FIG. 7) which coact with respective lugs 124' on frame 113 and which, on being turned through 180°, raise the frame 113 with its racks 114 and the carriage 115 to a level high enough to elevate the pallet 112 above the upper surface of arm 114. Carriage 115 can then be driven by motor 118 to shift a load 125 from one end of arm 111 to the other, in the manner and for the purpose described above with reference to FIGS. 4 - 6.

As seen in FIG. 3, the passageways 6 and 7 can be used as corridors for moving a load-bearing pallet (by hand or with the aid of a fork-lift truck) transversely along a rack into alignment with any storage space of levels $c - f$ for pick-up by an adjacent stacker frame, e.g. for delivery to an external unloading station or for transfer to another stack where its contents may be partly stored and partly repackaged for inclusion in an outgoing shipment. Such shipments may take the form of full-sized or fractional loads according to requirements. Thus, for example, an order to be made up in corridor 6 of rack 2 may require goods stored on a different level in stack C or D of rack 4, in which case the stacker crane 5 shown in FIG. 1 will pick up these goods, bring them to the level $c$ of rack 3, transfer them to stack A of that rack, let the personnel in corridor 6 thereof move them on their pallet into a free storage space of stack D, and transfer the goods with their pallets from the latter space through the intervening aisle or aisles 20 to stack A of rack 2 for further handling by the operators in passageway 6 thereof.

The highly flexible system of my invention is readily adaptable to changing conditions, e.g. to a reallocation of storage spaces within a rack or among different racks.

The described and illustrated pallet carriers may be modified in various ways, e.g. by replacing the single telescoped arm 11 with a pair of parallel arms of this type, without departing from the spirit and scope of my invention as defined in the appended claims.

I claim:

1. A shelving system for the storage of pallet-size loads, comprising:

a plurality of stacks of shelves each vertically subdivided into a multiplicity of tiers positioned on the same levels in said plurality of stacks, longitudinally adjoining stacks being separated by a transversely extending aisle, each stack having a depth of several storage spaces each accommodating a pallet-size load, said aisle having a depth substantially equaling at least twice the depth of a storage space;

hoisting means in said aisle including a pallet carrier alignable with the tiers of the adjoining stack on any level, said carrier comprising a platform, a longitudinally extendable arm on said platform substantially spanning the depth of said aisle when in a contracted position, lifting means alongside said arm on said platform, and transfer means mounted on said lifting means and longitudinally displaceable thereon between opposite extremities of said arm, the length of said transfer means being less than the length of said arm in said contracted position thereof; and mechanism on said carrier for placing said transfer means under a pallet riding on one extremity of the contracted arm, actuating said lifting means to engage said transfer means with the pallet and raise the latter off said arm, displacing said transfer means on said lifting means into an alternate position relative to said arm, depositing the pallet on the other extremity of said arm with disengagement of said transfer means therefrom, and extending said arm into the adjoining stack on the side of said other extremity, said stacks being provided at certain levels with throughgoing transverse passageways adjoining a single row of storage spaces next to said aixle.

2. A shelving system as defined in claim 1 wherein superimposed passageways at different levels have ends interconnected by a vertical shaft.

3. A shelving system as defined in claim 1 wherein the depth of said aisle slightly exceeds the depth of two storage spaces, the length of said transfer means substantially equaling half the length of said arm.

* * * * *